United States Patent
Miyajima

(10) Patent No.: US 8,913,786 B2
(45) Date of Patent: Dec. 16, 2014

(54) DRIVING SUPPORT SYSTEM, DRIVING SUPPORT PROGRAM, AND DRIVING SUPPORT METHOD

(75) Inventor: Takayuki Miyajima, Anjo (JP)

(73) Assignee: Aisin AW Co., Ltd., Aichi-ken (JP)

( * ) Notice: Subject to any disclaimer, the term of this patent is extended or adjusted under 35 U.S.C. 154(b) by 479 days.

(21) Appl. No.: 13/304,486

(22) Filed: Nov. 25, 2011

(65) Prior Publication Data

US 2012/0140984 A1 Jun. 7, 2012

(30) Foreign Application Priority Data

Dec. 2, 2010 (JP) .................. 2010-269474

(51) Int. Cl.
| | |
|---|---|
| G06K 9/00 | (2006.01) |
| B60W 40/04 | (2006.01) |
| G06K 9/20 | (2006.01) |
| B60W 10/06 | (2006.01) |
| B60W 10/10 | (2012.01) |
| B60W 10/18 | (2012.01) |
| B60W 10/20 | (2006.01) |
| B60W 10/22 | (2006.01) |

(52) U.S. Cl.
CPC .......... *B60W 40/04* (2013.01); *G06K 9/00993* (2013.01); *G06K 9/2054* (2013.01); *G06K 9/00798* (2013.01); *B60W 10/06* (2013.01); *B60W 10/10* (2013.01); *B60W 10/18* (2013.01); *B60W 10/20* (2013.01); *B60W 10/22* (2013.01); *B60W 2420/42* (2013.01); *B60W 2550/402* (2013.01)
USPC ........................................ 382/103

(58) Field of Classification Search
USPC ................................. 382/100, 103
See application file for complete search history.

(56) References Cited

U.S. PATENT DOCUMENTS

| 7,221,792 B2 | 5/2007 | Matsuda et al. |
| 7,369,698 B2 | 5/2008 | Okutsu et al. |

(Continued)

FOREIGN PATENT DOCUMENTS

| CN | 1460917 A | 12/2003 |
| EP | 1975565 A2 | 10/2008 |

(Continued)

OTHER PUBLICATIONS

Japanese Office Action, dated Jan. 23, 2014, issued in corresponding Japanese Patent Application No. 2010-269474.

(Continued)

*Primary Examiner* — Shefali Goradia
(74) *Attorney, Agent, or Firm* — Sughrue Mion, PLLC

(57) ABSTRACT

Provided is a driving support system that includes an image recognition unit that performs image recognition processing to recognize if a recognition object associated with any of the support processes is included in image data captured by an on-vehicle camera and a recognition area information storage unit that stores information regarding a set recognition area in the image data that is set depending on a recognition accuracy of the recognition object set for execution of the support process. A candidate process extraction unit is also included for extracting at least one execution candidate support process from the plurality of support processes and a support process execution management unit that allows execution of the extracted execution candidate support process on a condition that a position in the image data of the recognition object recognized by the image recognition processing is included in the set recognition area.

8 Claims, 11 Drawing Sheets

(56) References Cited

U.S. PATENT DOCUMENTS

| | | | |
|---|---|---|---|
| 7,515,744 | B2 | 4/2009 | Okutsu et al. |
| 7,623,680 | B2 | 11/2009 | Takahama et al. |
| 7,668,341 | B2 * | 2/2010 | Miyajima et al. ............. 382/104 |
| 7,720,586 | B2 | 5/2010 | Harumoto et al. |
| 8,111,887 | B2 | 2/2012 | Koh et al. |
| 8,477,999 | B2 * | 7/2013 | Nishida et al. ................ 382/104 |
| 8,694,236 | B2 * | 4/2014 | Takagi .......................... 701/300 |
| 2006/0002587 | A1 | 1/2006 | Takahama et al. |
| 2009/0265070 | A1 | 10/2009 | Okada et al. |

FOREIGN PATENT DOCUMENTS

| | | |
|---|---|---|
| EP | 2 288 138 A1 | 2/2011 |
| JP | 11-70884 A | 3/1999 |
| JP | 2004-341762 A | 12/2004 |
| JP | 2006-18751 A | 1/2006 |
| JP | 2006-071707 A | 3/2006 |
| JP | 2006-163879 A | 6/2006 |
| JP | 2006-209510 A | 8/2006 |
| JP | 2006-344032 A | 12/2006 |
| JP | 2007-305079 A | 11/2007 |
| JP | 2009-276200 A | 11/2009 |
| JP | 2010-221858 A | 10/2010 |
| WO | 2007/066506 A1 | 6/2007 |

OTHER PUBLICATIONS

Communication dated Sep. 25, 2014 from the European Patent Office in counterpart European Patent Application No. 11190676.4.
Apostoloff Nicholas, "Vision based lane tracking using multiple cues and particle filtering", Feb. 22, 2005, 193 Pages total , XP055140029.
Apostoloff N et al., "Vision In and Out of vehicles: Integrated Driver and Road Scene Monitoring", International Journal of Robotics Research, Sage Science Press, Thousand Oaks, U.S., vol. 23, No. 5, May 1, 2004, pp. 513-538, XP002515329, ISSN: 0278-3649.
Hui Kong et al., "Vanishing point detection for road detection", 2009 IEEE Conference on Computer Vision and Pattern Recognition: Jun. 20-15, 2009, pp. 96-103, XP031607314, sections 1, 4-6.

* cited by examiner

FIG. 3

| APPLICATION | ATTRIBUTE | | REQUIRED ACCURACY LEVEL (G) |
|---|---|---|---|
| BRAKE CONTROL PROCESS | FOR VEHICLE CONTROL | FOR SAFETY CONTROL | HIGH LEVEL (GH) |
| STEERING CONTROL PROCESS | | | |
| AIRBAG CONTROL PROCESS | | | |
| DRIVING FORCE CONTROL PROCESS | | | |
| LIGHT ADJUSTMENT CONTROL PROCESS | | | |
| WARNING CONTROL PROCESS | | | |
| SHIFT CONTROL PROCESS | | FOR DRIVING CONTROL | MEDIUM LEVEL (GM) |
| SUSPENSION CONTROL PROCESS | | | |
| CAUTION CONTROL PROCESS | | | |
| INFORMATION PROVISION PROCESS | FOR GUIDANCE | FOR GUIDANCE | LOW LEVEL (GL) |
| ALERTING PROCESS | | | |

74

AP1a, AP1b, AP1, AP2

F I G. 4
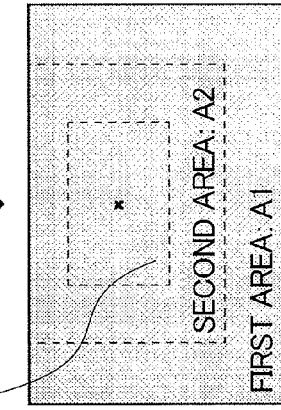
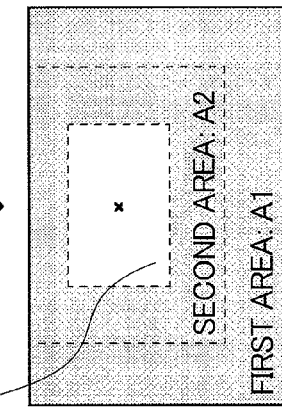
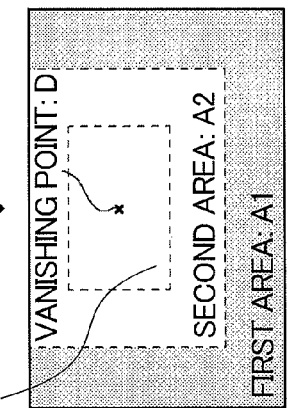

F I G . 8
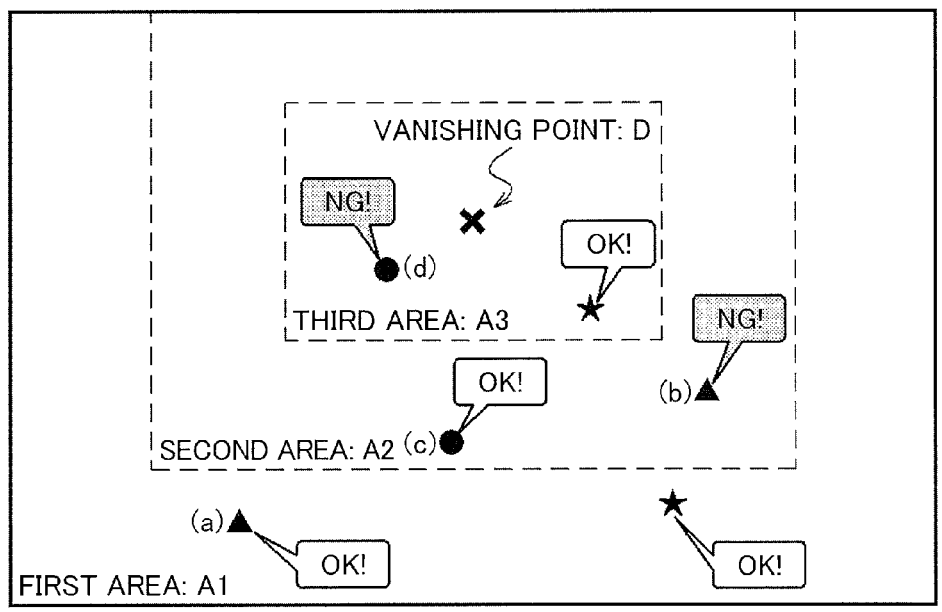

F I G. 11
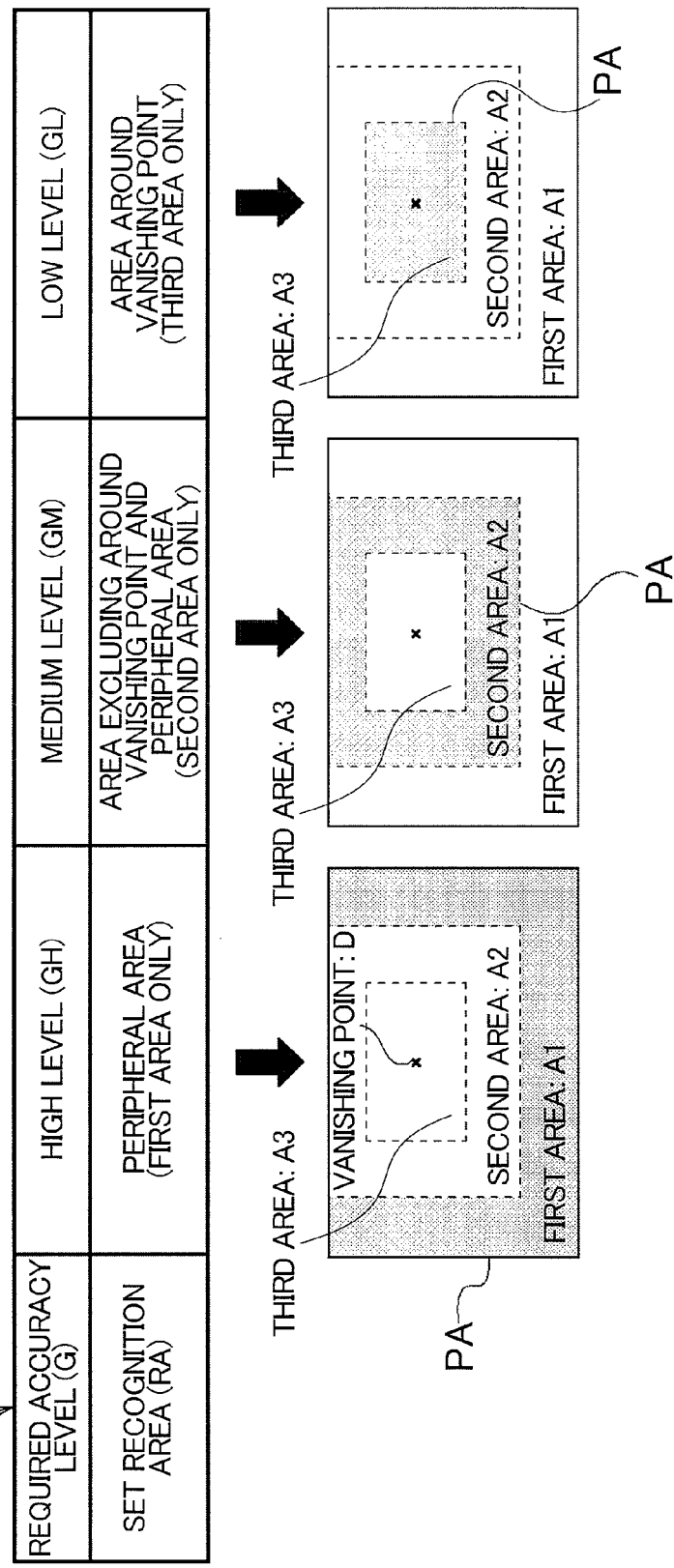

DRIVING SUPPORT SYSTEM, DRIVING SUPPORT PROGRAM, AND DRIVING SUPPORT METHOD

INCORPORATION BY REFERENCE

This application claims priority from Japanese Patent Application No. 2010-269474 filed on Dec. 2, 2010 including the specification, drawings and abstract thereof, the disclosure of which is incorporated herein by reference in its entirety.

BACKGROUND OF THE INVENTION

Aspects of the present invention relate to a driving support system that can execute a plurality of support processes related to driving support for a vehicle, and also relate to a driving support program and a driving support method of the driving support system.

DESCRIPTION OF THE RELATED ART

As the aforementioned driving support system, a system described in Japanese Patent Application Publication No. JP-A-2010-221858, for example, is already known. Namely, the driving support system according to JP-A-2010-221858 is configured as a system that coordinates a navigation system 1 and a vehicle control system 2 (this description cites reference symbols used in JP-A-2010-221858). The system can execute a plurality of support processes related to driving support for a vehicle, such as an automatic vehicle speed control process and an automatic brake control process performed using an actuator. According to JP-A-2010-221858, image data is generated from an image captured by a rear camera 24 serving as an on-vehicle camera disposed so as to face the road, and a vehicle acceleration control is executed based on an image recognition processing result of a prescribed recognition object (e.g., a crosswalk ahead of an intersection) included within the image data.

If position identification based on the image recognition processing result is utilized to perform the vehicle driving support, due to the optical characteristic of the image processing system using the on-vehicle camera, there is a difference in the measurement accuracy of the recognized object, as well as the accompanying recognition accuracy (which may also be referred to as "recognition accuracy or the like" below) and recognition success rate, depending on the position of the recognition object within the image data when the image recognition processing is performed. That is, the image recognition processing maintains a relatively high recognition success rate in an area near a vanishing point among the image data because the area is not likely to lack a feature point. However, compared to an area near the periphery of the image data, the measurement accuracy in the area near the vanishing point among the image data decreases because the positional displacement on the actual road corresponding to the displacement per pixel within the image data increases. Meanwhile, the image recognition processing maintains a relatively high recognition accuracy or the like in the area near the periphery among the image data compared to the area near the vanishing point among the image data, although the recognition success rate decreases because of the relatively large influence of positional displacement and directional displacement while the vehicle is traveling. In general, each support process has its own purpose, and the recognition accuracy or the like and the recognition success rate required varies depending on the purpose. Therefore, when performing the image recognition processing of a recognition object associated with each support process, a recognition accuracy or the like and a recognition success rate that correspond to the purpose of each support process should be secured (in general, there is a trade-off between the recognition accuracy or the like and the recognition success rate). In JP-A-2010-221858, no particular consideration is given to this point.

Although outside the field of driving support systems, Japanese Patent Application Publication No. JP-A-2006-71707 describes a superimposing type image observing device 100 (this description cites reference symbols used in JP-A-2006-71707) that utilizes image recognition technology. Two programs can be executed in the device of JP-A-2006-71707: a product information program that searches for information relevant to products such as clothing or the like included on a subject 110, and a navigation program that finds a current position of a user OBS. The device is configured such that, when acquiring image data from an imaging unit 104 for a pattern matching process performed by an image recognition unit 105, an imaging angle A of the imaging unit 104 can be switched in accordance with the program currently executed. In other words, the imaging unit 104 changes the magnification of a variable magnification optical system toward the telephoto end for the product information program that aims to reliably specify a target product, and changes the magnification of the variable magnification optical system toward the wide angle end for the navigation program that aims to image as many subjects 110 as possible to specify the current position.

Here, in order to secure a recognition accuracy or the like and a recognition success rate that correspond to the purpose of each support process, the operation of switching the imaging angle according to JP-A-2006-71707 may be applied to the driving support system of JP-A-2010-221858. However, in general, there are many types of support processes in a driving support system, and the operation to switch the imaging angle depending on the support process tends to be complicated. In addition, if a plurality of support processes is attempting to execute at the same time and the recognition accuracy or the like and the recognition success rate that correspond to the purpose of each support process is different, the image recognition processing of the recognition object associated with each support process must be sequentially performed due to the mechanical operation of changing the imaging angle, which means that the immediacy (real-time characteristic) of each support process may be lost. Therefore, simply applying the operation of switching the imaging angle according to JP-A-2006-71707 to the driving support system of JP-A-2010-221858 is not appropriate in terms of realizing rapid processing.

SUMMARY OF THE INVENTION

Hence, the realization of a driving support system that can easily and rapidly execute various driving support processes while securing a recognition accuracy that corresponds to the purpose of each driving support process is desired.

According to a first aspect of the present invention, a driving support system executes a plurality of support processes related to driving support for a vehicle. The driving support system includes: an image recognition unit that performs image recognition processing to recognize if a recognition object associated with any of the support processes is included in image data captured by an on-vehicle camera; a recognition area information storage unit that stores, for each of the plurality of support processes that operates based on a result of the image recognition processing, information regarding a set recognition area in the image data that is set depending on a recognition accuracy of the recognition object set for execution of the support process; a candidate process extraction unit that extracts at least one execution candidate support process from the plurality of support processes; and a support process execution management unit that allows execution of the extracted execution candidate support process on a condition that a position in the image data of the recognition object recognized by the image recognition processing is included in the set recognition area that is set for the execution candidate support process associated with the recognized recognition object.

Note that, a "recognition accuracy of the recognition object set for execution of the support process" is an image recognition accuracy set in order to execute without error the support process associated with the recognition target feature successfully found through image recognition. Normally a higher recognition accuracy of the recognition object is set for execution of a support process that more strongly requires execution at a precise position.

According to the first aspect of the present invention, based on the recognition result of the image recognition processing performed by the image recognition unit for the recognition object included in the image data, it is possible to determine whether to execute the support process associated with the recognition object. At such time, the information regarding the set recognition area in the image data for each of the plurality of support processes is stored in the recognition area information storage unit, and the set recognition area is set depending on the recognition accuracy of the recognition object set for execution of each support process. Therefore, execution of at least one execution candidate support process extracted from the plurality of support processes is allowed on the condition that the position in the image data of the recognition object recognized by the image recognition processing is included in the set recognition area that is set for that particular execution candidate support process. Thus, a recognition accuracy that corresponds to the purpose of the execution candidate support process can be suitably secured.

In addition, according to the first aspect of the present invention, the support process execution management unit can determine in a regular manner whether to execute the execution candidate support process based on the correspondence relationship between the position in the image data of the recognition object that is recognized by the image recognition processing and the set recognition area that is set for the execution candidate support process. Accordingly, the driving support processing can be easily and rapidly executed.

Hence, it is possible to realize a driving support system that can easily and rapidly execute various driving support processes while securing a recognition accuracy that corresponds to the purpose of each driving support process.

Here, according to a second aspect of the present invention, the plurality of support processes may include a first support process, and a second support process for which a recognition accuracy of the recognition object set for execution is lower than the recognition accuracy set for the first support process. The set recognition area that is set for the second support process may include an area closer to a vanishing point in the image data than the set recognition area that is set for the first support process.

According to the second aspect of the present invention, for the second support process that requires a relatively low recognition accuracy of the recognition object set for execution, the set recognition area is set so as to include an area nearer the vanishing point in the image data compared to the set recognition area that is set for the first support process that requires a higher recognition accuracy of the recognition object for execution than the second support process. In the area nearer the vanishing point in the image data, compared to an area nearer a peripheral edge portion in the image data, the on-vehicle camera images the same recognition object for a longer time with little variation in the image capture range. Therefore, it is possible to maintain a high recognition success rate of the recognition object. Accordingly, there is an increased probability that the second support process can be executed under set circumstances.

In addition, according to the second aspect of the present invention, for the first support process that requires a relatively high recognition accuracy of the recognition object set for execution, the set recognition area is set so as to include only an area farther from the vanishing point in the image data (an area nearer the peripheral edge portion in the image data) compared to the set recognition area that is set for the second support process that requires a lower recognition accuracy of the recognition object for execution than the first support process. In the area nearer the peripheral edge portion in the image data, the recognition object at a position nearer the vehicle is captured compared to an area nearer the vanishing point in the image data. Therefore, a high measurement accuracy and accompanying recognition accuracy of the recognition object is maintained. Accordingly, when the recognition object is found through image recognition, there is an increased probability that the first support process can be executed without error at a precise position.

According to a third aspect of the present invention, the plurality of support processes may be classified into a plurality of accuracy groups depending on the recognition accuracy set for each support process, and the recognition area information storage unit may store information regarding the set recognition area that is set depending on the recognition accuracy set for each accuracy group.

According to the third aspect of the present invention, the set recognition area for each support process can be set depending on the plurality of accuracy groups that is classified depending on the recognition accuracy. That is, by grouping the plurality of support processes depending on the set recognition accuracy, the set recognition area can be set by a relatively simple process for each support process.

According to a fourth aspect of the present invention, the driving support system may further include: a host vehicle position information acquisition unit that acquires host vehicle position information that indicates a current position of the vehicle; and a recognition processing area setting unit that sets a recognition processing area, which is an area in the image data, before execution of the image recognition processing for the recognition object, based on the set recognition area for each extracted execution candidate support process. The candidate process extraction unit may extract the execution candidate support process based on the host vehicle position information. The support process execution management unit may allow execution of the execution candidate support process if the recognition object associated with the execution candidate support process is recognized in the recognition processing area that is set by the recognition processing area setting unit.

According to the fourth aspect of the present invention, at least one execution candidate support process can be suitably extracted based on the host vehicle position information acquired by the host vehicle position information acquisition unit.

In addition, according to the fourth aspect of the present invention, the recognition processing area is set based on the information regarding the set recognition area for each execution candidate support process before execution of the image recognition processing. Therefore, if the recognition object associated with the execution candidate support process is recognized in the recognition processing area, execution of that particular execution candidate support process can be immediately allowed.

According to a fifth aspect of the present invention, the driving support system may further include: a host vehicle position information acquisition unit that acquires host vehicle position information that indicates a current position of the vehicle; and a priority setting unit that, for each extracted execution candidate support process, sets a higher priority for the execution candidate support process that requires a higher recognition accuracy. The candidate process extraction unit may extract the execution candidate support process based on the host vehicle position information. The support process execution management unit may execute the image recognition processing for the recognition object associated with the execution candidate support process in order starting from the execution candidate support process with the highest priority, and at least allow execution of the execution candidate support process associated with the recognition object that is first recognized.

According to the fifth aspect of the present invention, at least one execution candidate support process can be suitably extracted based on the host vehicle position information acquired by the host vehicle position information acquisition unit.

In addition, according to the fifth aspect of the present invention, the support process with a higher priority can be executed with priority. That is, the support process that requires high recognition accuracy and more strongly requires execution at a precise position can be executed with priority.

According to a sixth aspect of the present invention, the driving support system may further include: a host vehicle position information acquisition unit that acquires host vehicle position information that indicates a current position of the vehicle. The candidate process extraction unit may extract the execution candidate support process based on the host vehicle position information. The image recognition processing unit, with respect to the whole image data, may execute the image recognition processing for the recognition object associated with the extracted execution candidate support process. The support process execution management unit may allow execution of at least one execution candidate support process, among the extracted execution candidate support processes, for which a position in the image data of the recognition object that is recognized by the image recognition processing is included in the set recognition area that is set for the execution candidate support process.

According to the sixth aspect of the present invention, at least one execution candidate support process can be suitably extracted based on the host vehicle position information acquired by the host vehicle position information acquisition unit.

In addition, according to the sixth aspect of the present invention, after executing the image recognition processing with respect to the whole image data, whether to allow execution of the execution candidate support process can be retroactively determined based on the correspondence relationship between the set recognition area and the position in the image data of the recognition object that is recognized. Thus, utilizing a driving support system that employs ordinary existing image recognition technology, the driving support system according to the present invention can be constituted with the simple addition of a new function.

The technical constitution of the driving support system according to the present invention thus configured, having the respective aspects described above, may be applied to a driving support program and a driving support method, and therefore, the present invention also claims rights as this type of program and method.

In such case, according to a seventh aspect of the present invention, a driving support program of a driving support system that executes a plurality of support processes related to driving support for a vehicle executes in a computer the steps of: performing image recognition processing to recognize if a recognition object associated with any of the support processes is included in image data captured by an on-vehicle camera; extracting at least one execution candidate support process from the plurality of support processes; and, using information regarding a set recognition area in the image data that is stored in a recognition area information storage unit and set depending on a recognition accuracy of the recognition object set for execution of each of the plurality of support processes that operates based on a result of the image recognition processing, allowing execution of the execution candidate support process extracted at the candidate process extraction step on a condition that a position in the image data of the recognition object recognized by the image recognition processing is included in the set recognition area that is set for the execution candidate support process associated with the recognized recognition object.

According to an eighth aspect of the present invention, a driving support method of a driving support system that executes a plurality of support processes related to driving support for a vehicle includes the steps of: performing image recognition processing to recognize if a recognition object associated with any of the support processes, the recognition object being included in image data captured by an on-vehicle camera; extracting at least one execution candidate support process from the plurality of support processes; and, using information regarding a set recognition area in the image data that is stored in a recognition area information storage unit and set depending on a recognition accuracy of the recognition object set for execution of each of the plurality of support processes that operates based on a result of the image recognition processing, allowing execution of the execution candidate support process extracted at the candidate process extraction step on a condition that a position in the image data of the recognition object recognized by the image recognition processing is included in the set recognition area that is set for the execution candidate support process associated with the recognized recognition object.

Needless to say, the foregoing driving support program and driving support method are also capable of obtaining the actions and effects of the driving support system described above, and moreover, the several techniques cited as preferred constitutional examples thereof may be incorporated therein.

BRIEF DESCRIPTION OF THE DRAWINGS

FIG. 3 is a schematic diagram that illustrates an example of a required accuracy table according to the first embodiment;

FIG. 4 is a schematic diagram that illustrates an example of a set recognition area table according to the first embodiment;

FIG. 8 is a schematic diagram that illustrates the concept of the support process execution management processing according to the second embodiment;

FIG. 11 is a schematic diagram that illustrates an example of the set recognition area table according to another embodiment.

DETAILED DESCRIPTION OF THE EMBODIMENTS

1. First Embodiment

Figure 1:
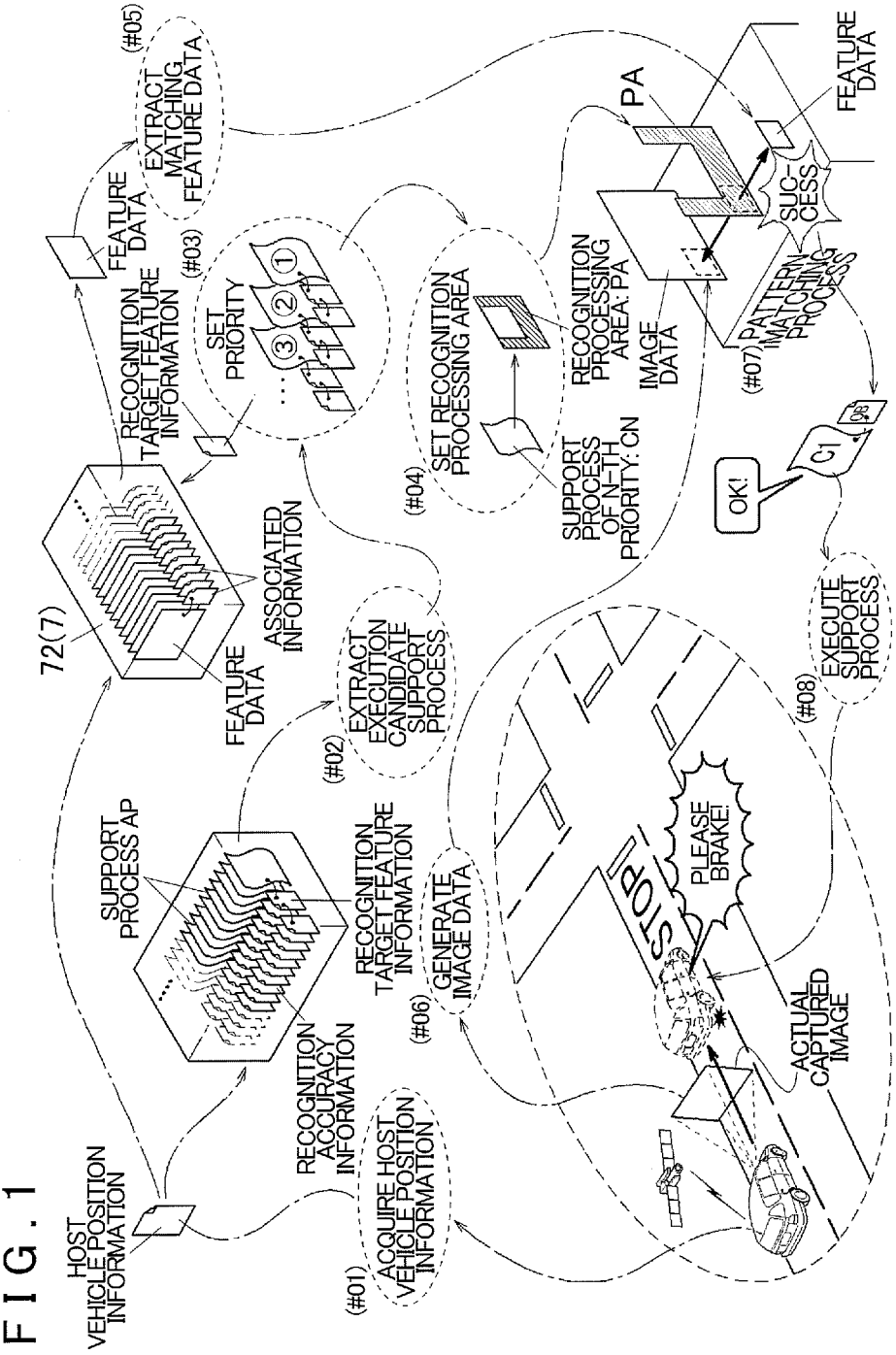
FIG. 1 is a schematic diagram that illustrates the concept of a driving support system according to a first embodiment.

A first embodiment of a driving support system according to the present invention will be described with reference to the drawings. A driving support system 1 according to the present embodiment is installed in a vehicle V, and is a system capable of executing a plurality of support processes (application programs) AP related to driving support for the vehicle V. The driving support system 1 according to the present embodiment will be described in detail below.

1-1. Overview of Driving Support System

First, the concept of the driving support system 1 according to the present embodiment will be explained with reference to FIG. 1. Generally speaking, the driving support system 1 executes a pattern matching process (an example of image recognition processing and sometimes also referred to as a "matching process" below) that finds a prescribed feature provided on the road in image data that is acquired through imaging performed by an on-vehicle camera 14 (see FIG. 2) installed in the vehicle V, and executes at least one of a plurality of support processes AP based on a result of the matching process. According to this example, in the driving support system 1, host vehicle position information is acquired in a prescribed cycle (step #01), and at least one execution candidate support process C is extracted from among the plurality of support processes AP based on the acquired host vehicle position information (step #02). In this case, the execution candidate support process C is a support process AP to be executed hereafter (a support process AP whose execution is planned in the near future).

Recognition target feature information is respectively associated with the support processes AP (including the execution candidate support processes C). The recognition target feature information is related to recognition target features OB that are respectively associated with the support processes AP. In addition, recognition accuracy information is respectively associated with the recognition target feature information. The recognition accuracy information is related to the recognition accuracy, which is set or required in order to execute the respective support processes AP, of the recognition target feature OB that is associated with a particular support process AP. Here, the "recognition accuracy" is an index that indicates the degree of accuracy at which the matching process can recognize the recognition target feature OB.

Based on the recognition accuracy information of the recognition target features OB respectively associated with the execution candidate support processes C extracted at step #02, the priority of each execution candidate support process C is set (step #03), and the plurality of execution candidate support processes C is prioritized. Based on the recognition accuracy information, a recognition processing area PA unique to the present application is set for the highest-priority (first in the order of the priority) execution candidate support process C (the execution candidate support process C that is N-th in the order of priority will be referred to as an "N-th execution candidate support process CN" below) (step #04). The recognition processing area PA is an area among the image data subject to the matching process. In the present embodiment, the recognition processing area PA coincides with a set recognition area RA (described later) for the execution candidate support process C. In addition, based on the host vehicle position information and the recognition target feature information associated with a first execution candidate support process C1, matching feature data is extracted from a feature database 72 (step #05).

In a different branch from the processing at steps #01 to #05, image data from an actual captured image acquired by the on-vehicle camera 14 is generated (step #06). The matching process is then performed based on the image data generated at step #06, the matching feature data extracted at step #05, and the recognition processing area PA set at step #04 (step #07). In the recognition processing area PA, if the recognition target feature OB associated with the first execution candidate support process C1 is recognized from among the image data, the first execution candidate support process C1 is allowed to execute. Afterwards, the first execution candidate support process C1 is actually executed (step #08).

In the present embodiment, the plurality of support processes AP includes a vehicle control support process AP1 and a guidance support process AP2. The vehicle control support process AP1 is mainly a support process for controlling a behavior of the vehicle V installed with the driving support system 1. Examples of the vehicle control support process AP1 include a shift control process, a suspension control process, a brake control process, a steering control process, an airbag control process, a driving force control process, a light adjustment control process, a warning control process, and a caution control process. Among these processes, the shift control process, the suspension control process, and the warning control process are support processes AP for driving control (driving control support processes AP1b), whereas the brake control process, the steering control process, the airbag control process, the driving force control process, the light adjustment control process, and the caution control process are support processes AP for safety control (safety control support processes AP1a).

The shift control process varies a speed ratio of a transmission provided in the vehicle V depending on the situation. The suspension control process adjusts a suspension characteristic of the vehicle V depending on the situation. The brake control process adjusts a braking force of an electronically controlled brake or the like depending on the situation. The steering control process adjusts a steering angle of the vehicle V depending on the situation. The airbag control process deploys driver and passenger airbags if the vehicle V is involved in a collision. The driving force control process adjusts a torque transmitted to a wheel of the vehicle V depending on the situation. The light adjustment control process adjusts an optical axis direction of a headlight in accordance with an advancing direction of the vehicle V. The warning control process outputs an audio warning depending on the circumstances of the vehicle V. The caution control process outputs an audio caution depending on the circumstances of the vehicle V.

The guidance support process AP2 is mainly a support process for providing various types of information to an occupant of the vehicle V through a navigation device (not shown) installed in the vehicle V. Examples of the guidance support process AP2 include an information provision process, and an alerting process. The information provision process provides the occupant with information related to facilities, the status of roads around the vehicle V, and the like. The alerting process notifies and alerts the occupant of predicted dangers based on the circumstances of the vehicle V. In the present embodiment, each of these processes corresponds to a "support process" according to the present invention.

1-2. Overall Configuration of Driving Support System

Figure 2:
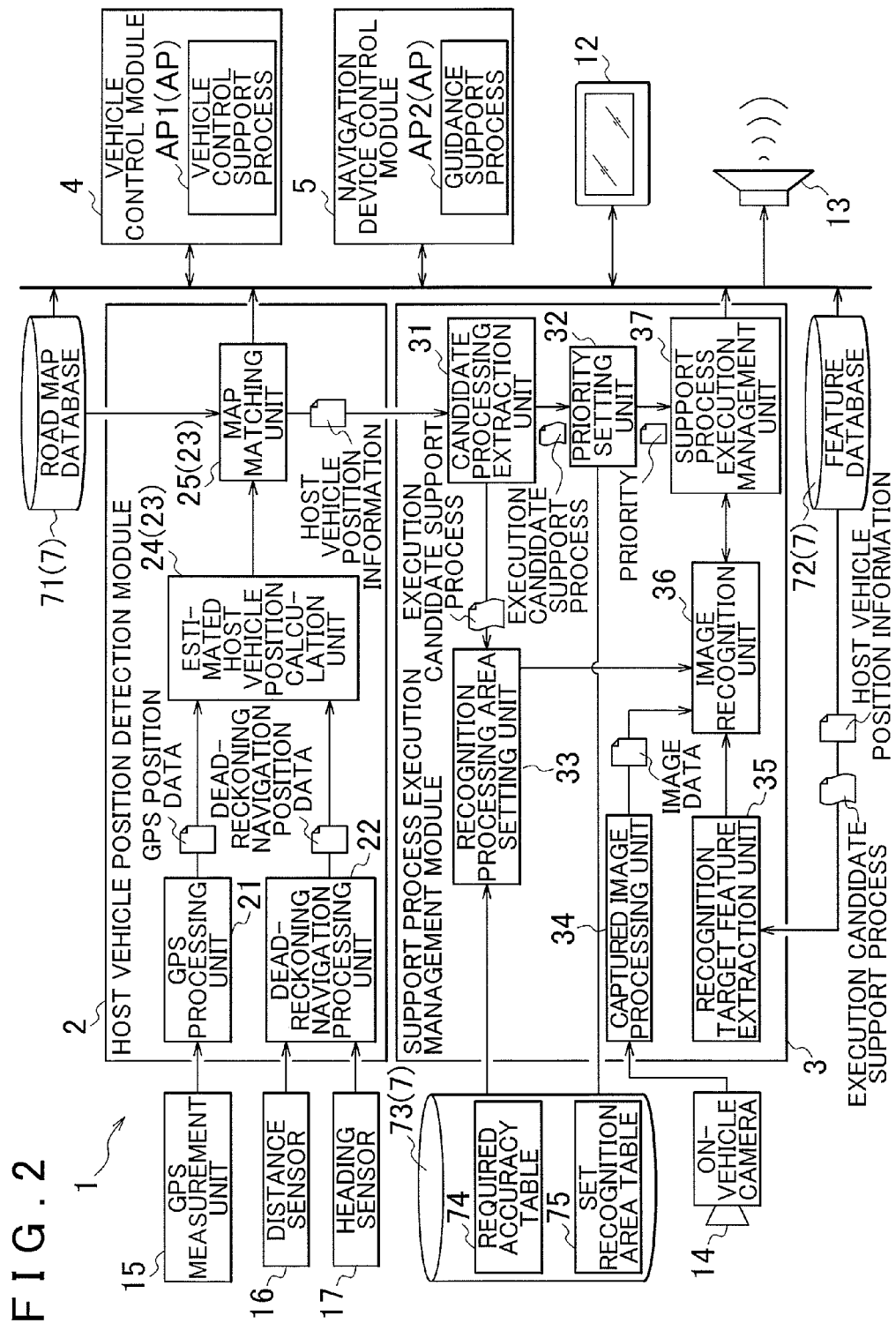
FIG. 2 is a schematic diagram that illustrates the overall configuration of the driving support system according to the first embodiment.

Next, the overall configuration of the driving support system 1 described above will be explained with reference to FIG. 2. As shown in FIG. 2, the driving support system 1 includes a host vehicle position detection module 2, a support process execution management module 3, a vehicle control module 4, a navigation device control module 5, and a storage device 7. The storage device 7 includes a road map database 71, the feature database 72, and a storage memory 73.

Each of the host vehicle position detection module 2, the support process execution management module 3, the vehicle control module 4, and the navigation device control module 5 includes at least one function unit, as described later. Each of these function units has as its core member a computational processing device such as a CPU or the like that is one of mutually shared and independently utilized. Each function unit may be configured by one of hardware, software (a program), and both hardware and software. Each of these function units is also configured so as to be capable of exchanging information with another function unit through a vehicle communication line such as a CAN (Controller Area Network). The function units are further configured so as to be capable of extracting prescribed data from the storage device 7 as necessary.

The storage device 7 includes, as a hardware configuration, a storage medium that is capable of storing and rewriting information such as a hard disk drive or a flash memory. Note that the road map database 71, the feature database 72, and the storage memory 73 constituting the storage device 7 may be in individual hardware or included in shared hardware.

1-2-1. Host Vehicle Position Detection Module

The host vehicle position detection module 2 includes a GPS processing unit 21, a dead-reckoning navigation processing unit 22, an estimated host vehicle position calculation unit 24, and a map matching unit 25. As shown in FIG. 2, in the present embodiment, the host vehicle position detection module 2 is connected to and can acquire information from a GPS measurement unit 15, a distance sensor 16, and a heading sensor 17 installed in the vehicle V, as well as the road map database 71.

The road map database 71 stores road map data. Here, the road map data includes inter-road connection information expressed by a plurality of nodes and a plurality of links, and attribute information such as a type (e.g., expressway, toll road, national road, or prefectural road), length, shape, and identifier of each road. The road map database 71 is referenced when the navigation device (not shown) executes a normal route search process and route guidance process, and when a map matching process (described later) is executed.

The GPS processing unit 21 is connected to the GPS measurement unit 15 that receives a GPS signal from a GPS (Global Positioning System) satellite. The GPS processing unit 21 analyzes the signal received by the GPS measurement unit 15 from the GPS satellite to calculate the current position (current position coordinates expressed as a longitude and a latitude) of the vehicle V, and outputs GPS position data that is the calculation result to the estimated host vehicle position calculation unit 24.

The dead-reckoning navigation processing unit 22 is connected to the distance sensor 16 and the heading sensor 17. The distance sensor 16 detects a vehicle speed of the vehicle V and a distance traveled. The distance sensor 16 outputs, as a detection result, information regarding the vehicle speed and the distance traveled to the dead-reckoning navigation processing unit 22. The heading sensor 17 is constituted by a gyroscopic sensor or a geomagnetic sensor, for example. The heading sensor 17 outputs, as a detection result, information regarding a heading to the dead-reckoning navigation processing unit 22. The dead-reckoning navigation processing unit 22 calculates dead-reckoning navigation position coordinates based on the travel distance information and the heading information sent moment to moment, and outputs dead-reckoning navigation position data that is the calculation result to the estimated host vehicle position calculation unit 24.

The estimated host vehicle position calculation unit 24 calculates, based on the GPS position data and the dead-reckoning navigation position data, the estimated current position of the vehicle V (estimated host vehicle position) using a commonly known method. Here, the estimated host vehicle position calculated by the estimated host vehicle position calculation unit 24 is information that includes a measurement error or the like. Therefore, the map matching unit 25 refers to the map data stored in the road map database 71 and corrects the host vehicle position coordinates such that the estimated host vehicle position is located on a road included in the road map data. The map matching unit 25 generates and acquires, as information that includes the corrected host vehicle position coordinates, host vehicle position information that expresses the current position of the vehicle V. In the present embodiment, a "host vehicle position information acquisition unit 23" is constituted by the estimated host vehicle position calculation unit 24 and the map matching unit 25. Note that the host vehicle position information acquisition unit 23 can also acquire highly accurate host vehicle position information based on the processing result of a matching process performed by an image recognition unit 36 (described later). The host vehicle position information acquisition unit 23 (map matching unit 25) outputs the acquired host vehicle position information to a candidate process extraction unit 31 and a recognition target feature extraction unit 35 (both described later).

1-2-2. Support Process Execution Management Module

The support process execution management module 3 includes the candidate process extraction unit 31, a priority setting unit 32, a recognition processing area setting unit 33, a captured image processing unit 34, the recognition target feature extraction unit 35, the image recognition unit 36, and a support process execution management unit 37. As shown in FIG. 2, in the present embodiment, the support process execution management module 3 is connected to and can acquire information from the on-vehicle camera 14 installed in the vehicle V, as well as the feature database 72 and the storage memory 73.

The on-vehicle camera 14 is an imaging device that images the landscape around the vehicle V at a prescribed timing. In the present embodiment, the on-vehicle camera 14 is a front camera that takes images of ahead of the vehicle V, and installed such that its optical axis faces forward in the advancing direction of the vehicle V. The on-vehicle camera 14 is constituted using a commonly known imaging element such as a CCD (Charge Coupled Device) sensor or a CMOS (Complementary Metal Oxide Semiconductor) sensor, and commonly known optical components such as a fish-eye lens or a prism. A captured image of the landscape around the vehicle V can be obtained as an actual captured image by the on-vehicle camera 14.

The feature database 72 stores feature data. Here, in the present embodiment, a "feature" includes signs, road markers, and the like provided on roads. The feature data also includes attribute information such as a type (e.g., lane marker, stop line, crosswalk, regulatory sign, or manhole), position, size, shape, height, and color of each feature. In addition, the feature data are respectively associated with the road map data stored in the road map database 71 using associated information such as an identifier. The feature database 72 is referenced when executing the pattern matching process (described later) or the like. Therefore, the respective feature data also includes information related to a feature point set.

The candidate process extraction unit 31 extracts, as the execution candidate support process C, at least one support process AP from among the plurality of support processes AP. In the present embodiment, the candidate process extraction unit 31 receives the host vehicle position information from the host vehicle position information acquisition unit 23 (map matching unit 25), and extracts the execution candidate support process C based on the host vehicle position information. The candidate process extraction unit 31 extracts, as the execution candidate support process C, at least one support process AP predicted to be executed thereafter based on the current position of the vehicle V. As an example, if the vehicle V is within a prescribed distance from a particular intersection at which vehicles must stop, the candidate process extraction unit 31 extracts the alerting process as the execution candidate support process C in order to alert the driver at a prescribed timing. Moreover, based on the subsequent behavior of the vehicle V, it may be determined that there is a risk of the vehicle V not being able to stop in a suitable manner at the stop point. In such case, an audio warning and an audio caution must be output, and a brake assist performed. Therefore, the candidate process extraction unit 31 extracts the warning control process, the caution control process, and the brake control process as the execution candidate support processes C. The candidate process extraction unit 31 outputs the extracted execution candidate support processes C to the priority setting unit 32, the recognition processing area setting unit 33, and the recognition target feature extraction unit 35.

The priority setting unit 32 sets a priority for each of the extracted execution candidate support processes C. Here, the priority setting unit 32 sets the priority of each of the execution candidate support processes C such that a higher priority is given to the respective execution candidate support processes C that require a higher recognition accuracy. Here, a "recognition accuracy required by the support process AP" is an image recognition accuracy set or required in order to execute without error the support process AP associated with the recognition target feature OB found through matching. The support process AP whose wrong execution should be more strictly avoided has a higher required recognition accuracy, and the support process AP whose wrong execution is more allowed to a certain degree has a lower required recognition accuracy. Note that "wrong execution" refers to the execution of the support process AP at a position where that particular support process AP should normally not be executed.

In the present embodiment, the recognition accuracy required by the vehicle control support process AP1 is set higher than the recognition accuracy required by the guidance support process AP2. Among the vehicle control support processes AP1, the recognition accuracy required by the safety control support process AP1$a$ is set higher than the recognition accuracy required by other support processes (the driving control support process AP1$b$). In the present embodiment, the plurality of support processes AP is classified into a plurality of accuracy groups G depending on the recognition accuracy required by each support process AP. According to the present embodiment, the recognition accuracy is classified into three accuracy groups G in the order of highest required recognition accuracy first: a high accuracy group GH that includes the safety control support process AP1$a$, a medium accuracy group GM that includes the driving control support process AP1$b$, and a low accuracy group GL that includes the guidance support process AP2.

Here, the safety control support process AP1$a$ belonging to the high accuracy group GH is a support process that forcibly changes a behavior of the vehicle V, and therefore requires execution without error at a precise position. On the other hand, the guidance support process AP2 belonging to the low accuracy group GL is a support process for increasing the convenience of an occupant of the vehicle V, and therefore more importance is placed on operation frequency and some wrong execution (i.e., execution at a somewhat wrong position) is allowed to a certain degree. Meanwhile, the driving control support process AP1$b$ belonging to the medium accuracy group GM requires a moderate degree of both positional correctness and operation frequency. Thus, the support processes are grouped as described above in consideration of this point.

In the present embodiment, information regarding the accuracy groups G that corresponds to the recognition accuracy required by each support process AP is stored in the storage memory 73 in the form of a required accuracy table 74. FIG. 3 is a schematic diagram that illustrates an example of the required accuracy table 74 according the present embodiment. As shown in FIG. 3, for each support process AP, the required accuracy table 74 associates and stores the attribute (application) and the accuracy group G (indicated as a "required accuracy level G" in FIG. 3) of the support process AP. The priority setting unit 32 refers to the required accuracy table 74 to set the priority of each execution candidate support process C. The priority setting unit 32 outputs information regarding the set priority to the support process execution management unit 37.

Figure 5:
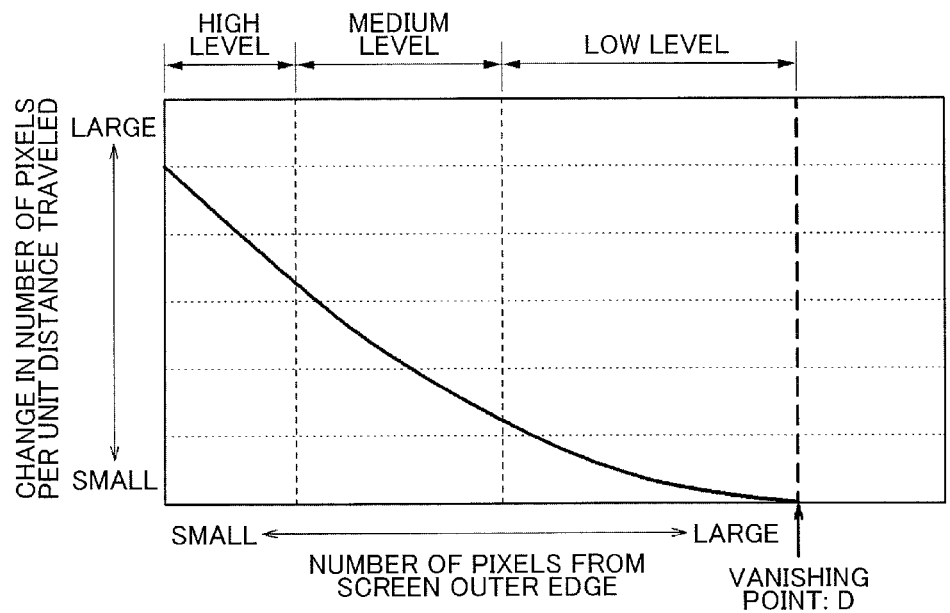
FIG. 5 is a graph for explaining a setting principle of the set recognition area based on a recognition accuracy.

The storage memory 73 further stores a set recognition area table 75 in the present embodiment. The set recognition area table 75 stores information regarding the set recognition area RA among the image data, which is set in accordance with the recognition accuracy required by each accuracy group (required accuracy level) G. In the present embodiment, the storage memory 73 corresponds to a "recognition area information storage unit" according to the present invention. FIG. 4 illustrates an example of the set recognition area table 75. Here, a setting principle of the set recognition area RA based on the recognition accuracy will be explained. A graph in FIG. 5 illustrates the relationship between a distance (number of pixels) from an outer edge of the image data and a movement amount (change in number of pixels) in the image data per unit distance traveled by the vehicle V.

Referring to this graph, the movement amount in the image data per unit distance traveled by the vehicle V increases closer to the outer edge of the image data, and the movement amount in the image data per unit distance traveled by the vehicle V decreases farther from the outer edge of the image data (closer to a vanishing point D). Conversely, the weight of the actual road distance per pixel in the image data decreases closer to the outer edge of the image data, and the weight of the actual road distance per pixel in the image data increases farther from the outer edge of the image data (closer to the vanishing point D). Note that the "vanishing point D" is a point at which parallel straight line segments (e.g., straight roads) actually intersect one another in the image data.

Considering this point, in an outer edge area that is an area near the outer edge, a subject is imaged with a relatively high positional accuracy and at a relatively fast traveling speed. Therefore, when the subject is the target of the pattern matching process, the positioning accuracy and accompanying recognition accuracy are relatively high. This characteristic is compatible with the above requirements for the support process AP belonging to the high accuracy group GH. Meanwhile, in a vanishing area that is an area near the vanishing point D, a subject is imaged at a relatively slow traveling speed. Therefore, when the subject is the target of the pattern matching process, the recognition success rate is relatively high. This characteristic is compatible with the above requirements for the support process AP belonging to the low accuracy group GL.

Thus, in the present embodiment as shown in FIG. 4, a peripheral area in the image data is set as the set recognition area RA for the support process AP (safety control support process AP1*a*) of the high accuracy group GH. For the support process AP (driving control support process AP1*b*) of the medium accuracy group GM, an area excluding around the vanishing point D in the image data is set as the set recognition area RA. For the support process AP (guidance support process AP2) of the low accuracy group GL, a whole area in the image data is set as the set recognition area RA. In other words, according to the present embodiment, the set recognition area RA for each accuracy group G is set so as to include an area closer to the vanishing point D as the required accuracy level decreases, while also including a common outer edge.

With such setting, the set recognition area RA set for the guidance support process AP2 includes an area closer to the vanishing point D in the image data than the set recognition area RA set for the vehicle control support process AP1 (which includes both the safety control support process AP1*a* and the driving control support process AP1*b*). Thus, in the present embodiment, based on the relationship between the vehicle control support process AP1 and the guidance support process AP2, the vehicle control support process AP1 corresponds to a "first support process" according to the present invention and the guidance support process AP2 corresponds to a "second support process" according to the present invention.

In addition, the set recognition area RA set for the driving control support process AP1*b* among the vehicle control support processes AP1 includes an area closer to the vanishing point D in the image data than the set recognition area RA set for the safety control support process AP1*a*. Thus, in the present embodiment, based on the relationship between the safety control support process AP1*a* and the driving control support process AP1*b*, the safety control support process AP1*a* corresponds to the "first support process" according to the present invention and the driving control support process AP1*b* corresponds to the "second support process" according to the present invention.

The recognition processing area setting unit 33 sets the recognition processing area PA for executing the matching process of the recognition target features OB respectively associated with the extracted execution candidate support processes C. Here, the recognition processing area PA is a prescribed area in the image data, and a range of the recognition processing area PA is set depending on the recognition accuracy required by the execution candidate support process C. In the present embodiment, the recognition processing area setting unit 33 refers to the set recognition area table 75, and sets the recognition processing area PA based on the set recognition area RA for each execution candidate support process C. In this example, the recognition processing area setting unit 33 sets the recognition processing area PA as identical to the set recognition area RA of each execution candidate support process C. Thus, in this example, the recognition processing area PA and the set recognition area RA for each execution candidate support process C coincide with each other.

That is, in the present embodiment, a peripheral area (only a first area A1 in the lower half of FIG. 4) in the image data is set as the recognition processing area PA for the support process AP (safety control support process AP1*a*) of the high accuracy group GH in accordance with the set recognition area RA as described above. For the support process AP (driving control support process AP1*b*) of the medium accuracy group GM, an area excluding around the vanishing point D (an area formed of the first area A1 and a second area A2 in the lower half of FIG. 4) in the image data is set as the recognition processing area PA. For the support process AP (guidance support process AP2) of the low accuracy group GL, a whole area (an area formed of the first area A1, the second area A2, and a third area A3 in the lower half of FIG. 4) in the image data is set as the recognition processing area PA. The recognition processing area setting unit 33 outputs information regarding the set recognition processing area PA to the image recognition unit 36.

The captured image processing unit 34 generates image data by extracting a plurality of feature points from the actual captured image, which is a captured image taken of the landscape around the vehicle V by the on-vehicle camera 14. In the present embodiment, the captured image processing unit 34 generates an edge detection image by performing an edge detection process on the actual captured image, extracts edge points found based on the edge detection image as feature points, and generates image data that is formed of a feature point set. Note that when performing the edge detection process, the edge points may be extracted based on a luminance difference (concentration difference), a color intensity difference, a color phase difference, and the like in the actual captured image. The captured image processing setting unit 34 outputs the generated image data to the image recognition unit 36.

The recognition target feature extraction unit 35 receives the host vehicle position information from the host vehicle position information acquisition unit 23 (map matching unit 25), and also receives information regarding the execution candidate support process C from the candidate process extraction unit 31. Based on such information, the recognition target feature extraction unit 35 extracts the recognition target feature OB. The recognition target feature extraction unit 35 refers to the feature database 72 to extract, as the recognition target feature OB, a feature around the host vehicle position associated with the execution candidate support process C. As an example, if the vehicle V is within a prescribed distance from a particular intersection at which vehicles must stop, the recognition target feature extraction unit 35 extracts the "STOP" regulatory sign, for example, associated with the alerting process as the recognition target feature OB. Moreover, it may be subsequently determined that there is a risk of the vehicle V not being able to stop in a suitable manner at the stop point. In such case, the recognition target feature extraction unit 35 extracts a stop line road marker, for example, associated with the brake control process as the recognition target feature OB. In the present embodiment, the recognition target feature OB corresponds to a "recognition object" according to the present invention. The recognition target feature extraction unit 35 outputs feature data for the extracted recognition target feature OB to the image recognition unit 36 as the matching feature data.

The image recognition unit 36 receives the image data from the captured image processing unit 34, and also receives the matching feature data from the recognition target feature extraction unit 35. The image recognition unit 36 then performs the pattern matching process on the image data and the matching feature data. At such time, in the present embodiment, the image recognition unit 36 further receives the information regarding the recognition processing area PA from the recognition processing area setting unit 33, and performs the matching process in the recognition processing area PA. In addition, following a command from the support process execution management unit 37, the image recognition unit 36 performs the matching process in order starting with the matching feature data of the recognition target feature OB associated with the highest priority execution candidate support process C.

In the matching process, the image recognition unit 36 determines whether there is a match based on the layout of the feature point set included in the matching feature data, and the layout of the feature point set included in the recognition processing area PA in the image data. In other words, the image recognition unit 36 determines that there is a match if the recognition processing area PA in the image data at least partially includes a feature point set that coincides with the layout of the feature point set included in the matching feature data. However, the image recognition unit 36 determines that there is no match if the recognition processing area PA in the image data does not include any feature point set that coincides with the layout of the feature point set included in the matching feature data. The image recognition unit 36 outputs information regarding the determination result of the matching process to the support process execution management unit 37.

Note that if there is a match, the image recognition unit 36 reads position information included in the matching feature data and also outputs the position information to the host vehicle position information acquisition unit 23. The host vehicle position information acquisition unit 23 receives the position information and corrects the host vehicle position by replacing the previously acquired host vehicle position information with the newly received position information. Thus, the host vehicle position information acquisition unit 23 can acquire more highly accurate host vehicle position information based on the processing result of the matching process performed by the image recognition unit 36.

The support process execution management unit 37 receives the determination result of the matching process from the image recognition unit 36, and determines whether to execute the execution candidate support process C based on the determination result. The support process execution management unit 37 allows execution of the execution candidate support process C on the condition that the position in the image data of the recognition target feature OB recognized by the matching process is included in the set recognition area RA set for the execution candidate support process C. Here, in the present embodiment, the recognition processing area PA is set as described above before executing the matching process, and the matching process is then executed in the recognition processing area PA. In addition, the recognition processing area PA coincides with the set recognition area RA. Thus, if a result determining a successful match is acquired, the position in the image data of the recognition target feature OB recognized by the matching process is always included in the set recognition area RA set for the execution candidate support process C.

Therefore, according to the present embodiment, the support process execution management unit 37 allows execution of the execution candidate support process C associated with the recognition target feature OB if a result determining a successful match is acquired. However, if a result determining no match is acquired, the support process execution management unit 37 prohibits (abandons) execution of the execution candidate support process C associated with the recognition target feature OB, and commands the image recognition unit 36 to perform the matching process for the recognition target feature OB associated with the execution candidate support process C having the next highest priority. The support process execution management unit 37 repeats this until a result determining a successful match is acquired.

In other words, until the first result determining a successful match is acquired, the support process execution management unit 37 commands the image recognition unit 36 to perform the matching process for the recognition target features OB respectively associated with the first execution candidate support process C1, a second execution candidate support process C2, a third execution candidate support process C3, and so forth in that order. If the support process execution management unit 37 allows execution of any of the execution candidate support processes C, information regarding the determination results of the matching processes (here, results determining successful matches) is output to the vehicle control module 4 or the navigation device control module 5 depending on the attributes of those execution candidate support processes C.

1-2-3. Vehicle Control Module

The vehicle control module 4 includes the aforementioned plurality of executable vehicle control support processes AP1 (including both the safety control support process AP1*a* and the driving control support process AP1*b*). If a result determining a successful match is received from the support process execution management unit 37, the vehicle control module 4 executes the vehicle control support process AP1 associated with the successfully matched recognition target feature OB, and controls various types of behaviors of the vehicle V through a vehicle ECU (Electronic Control Unit, not shown). As an example, FIG. 1 illustrates a case in which the brake control process is executed and the electronically controlled brake is activated.

1-2-4. Navigation Device Control Module

The navigation device control module 5 includes the aforementioned plurality of executable guidance support processes AP2. If a result determining a successful match is received from the support process execution management unit 37, the navigation device control module 5 executes the guidance support process AP2 associated with the successfully matched recognition target feature OB, and provides various types of information to the occupant of the vehicle V through the navigation device (not shown), a monitor 12, and a speaker 13. As an example, FIG. 1 illustrates a case in which the caution control process is executed and an audio caution, "Please brake!" is output from the speaker 13.

1-3. Procedure for Support Process Execution Management Processing

Next, a procedure for driving support processing that includes the support process execution management processing executed in the driving support system 1 (a driving support method that includes a support process execution management method) according to the present embodiment will be explained. The procedure for the driving support processing that is explained below is executed by one of hardware, software (a program), and both hardware and software that configure the various function units of the driving support system 1. If the various function units of the driving support system 1 are configured from programs, the computational processing device that is included in the driving support system 1 operates as a computer that executes the programs that configure the various function units of the driving support system 1.

Figure 6:
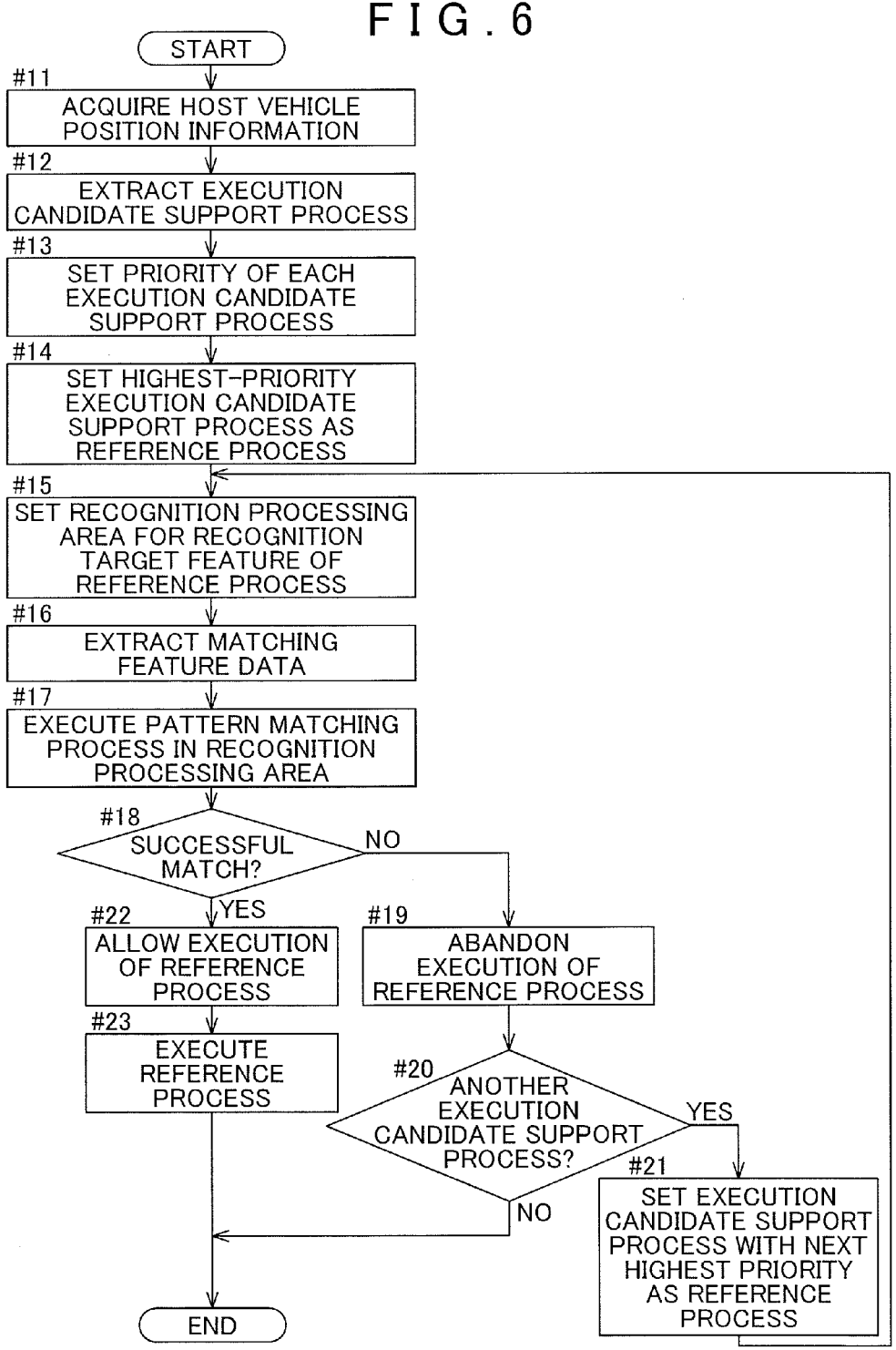
FIG. 6 is a flowchart that illustrates the procedure for support process execution management processing according to the first embodiment.
Figure 7:
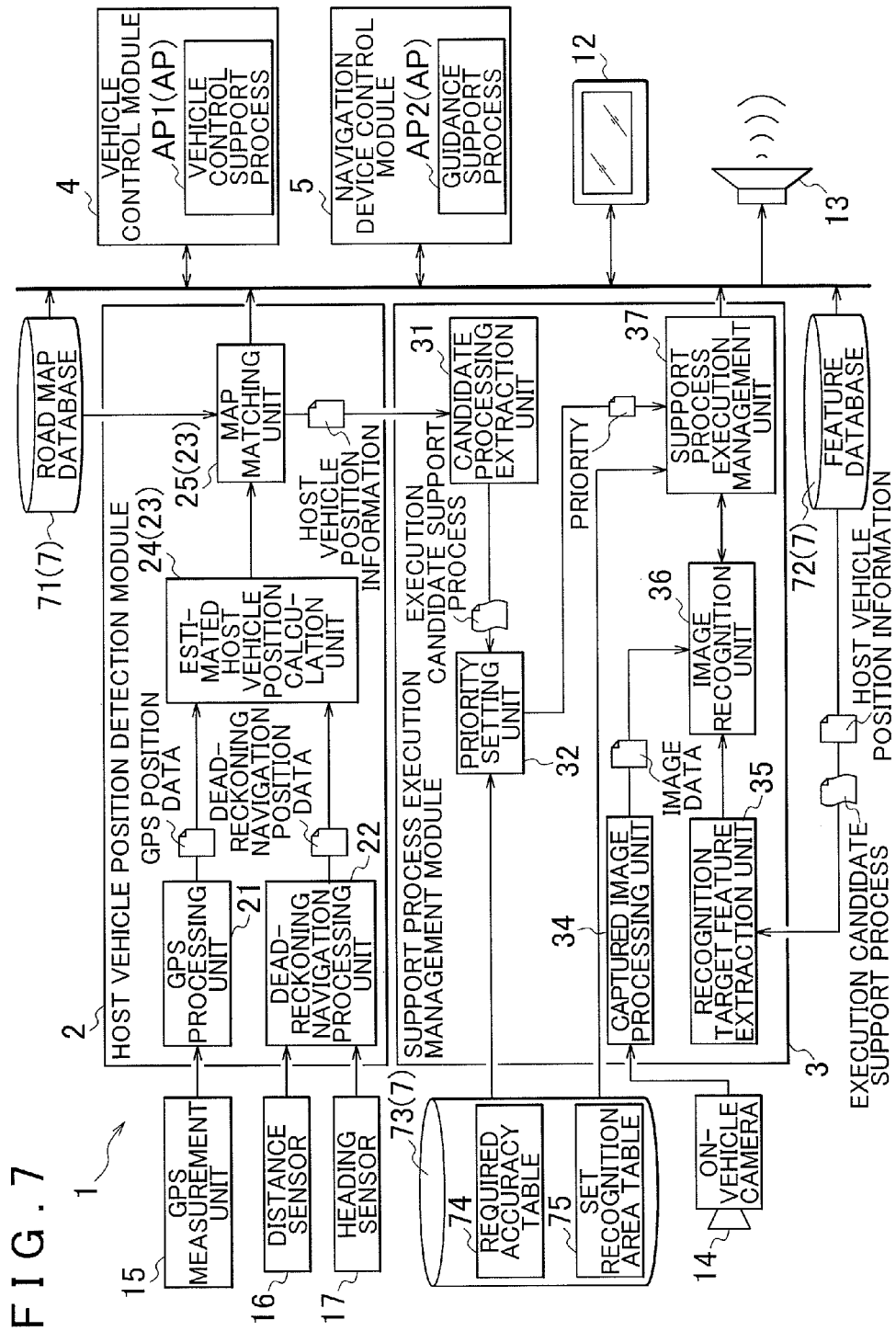
FIG. 7 is a schematic diagram that illustrates the overall configuration of the driving support system according to a second embodiment.

As shown in a flowchart in FIG. 6, first, the host vehicle position information acquisition unit 23 acquires the host vehicle position information (step #11). The candidate process extraction unit 31 extracts at least one execution candidate support process C based on the host vehicle position information (step #12). The priority setting unit 32 sets a priority for each of the extracted execution candidate support processes C (step #13). The support process execution management unit 37 selects the execution candidate support process C assigned with the highest priority from among the plurality of extracted execution candidate support processes C (selects the first execution candidate support process C1), and sets that particular execution candidate support process C as a reference process (step #14). The recognition processing area setting unit 33 refers to the set recognition area table 75, and sets the recognition processing area PA for executing the matching process of the recognition target feature OB associated with the reference process depending on the recognition accuracy required by the reference process (step #15).

In a different branch, the captured image processing unit 34 generates the image data from the actual captured image taken by the on-vehicle camera 14 (see step #06 in FIG. 1). The recognition target feature extraction unit 35 extracts the recognition target feature OB associated with the reference process as the matching feature data (step #16). The image recognition unit 36 performs the pattern matching process on the image data and the matching feature data for the reference process in the recognition processing area PA (step #17). If there is no match (step #18: No), the support process execution management unit 37 abandons (prohibits) execution of the reference process set at such time (step #19). If there is another execution candidate support process C (step #20: Yes), the execution candidate support process C with the next highest priority after the currently set reference process is selected, and that particular execution candidate support process C is set as the reference process (step #21). Note that if there is no other execution candidate support process C (step #20: No), the support process execution management processing is ended.

The various processing at steps #15 to #21 is repeatedly executed until there is a successful match. In such case, each time the reference process is newly set, the recognition processing area setting unit 33 again sets the recognition processing area PA that corresponds to the new reference process. Likewise, each time the reference process is newly set, the recognition target feature extraction unit 35 also again extracts the matching feature data that corresponds to the new reference process. Then, the image recognition unit 36 performs the matching process starting in order from the execution candidate support process C with the highest priority.

With regard to any of the execution candidate support processes C, if there is a match (step #18: Yes), the support process execution management unit 37 allows execution of the reference process set at such time (step #22). Thereafter, the vehicle control module 4 or the navigation device control module 5 actually executes the reference process. The support process execution management processing is then ended. However, note that the support process execution management processing described above is repeatedly performed in succession while the vehicle V is traveling.

2. Second Embodiment

A second embodiment of the driving support system according to the present invention will be described with reference to the drawings. The driving support system 1 according to the present embodiment partially differs from the configuration of the first embodiment with respect to the configuration of the support process execution management module 3 and the specific procedure of the support process execution management processing. The following description will focus on points where the driving support system 1 according to the present embodiment differs from that of the first embodiment. Note that aspects not described in particular detail are similar to those of the first embodiment.

2-1. Support Process Execution Management Module

The support process execution management module 3 according to the present embodiment includes the candidate process extraction unit 31, the priority setting unit 32, the captured image processing unit 34, the recognition target feature extraction unit 35, the image recognition unit 36, and the support process execution management unit 37. Note that, unlike the first embodiment described earlier, the support process execution management module 3 does not include the recognition processing area setting unit 33.

Therefore, in the present embodiment, the recognition processing area PA is not set before performing the pattern matching process as in the first embodiment. Regardless of the recognition accuracy required by the respective execution candidate support processes C, the image recognition unit 36 executes the matching process for all of the image data. In the present embodiment, if there is a match between the image data and the matching feature data of the recognition target feature OB, the image recognition unit 36 generates and acquires the position information (matching position information) in the image data where the recognition target feature OB was recognized through the matching process. The image recognition unit 36 outputs information regarding the determination result of the matching process and the matching position information to the support process execution management unit 37.

The recognition processing area setting unit 37 refers to the set recognition area table 75 of the storage memory 73, and acquires information regarding the set recognition area RA for each execution candidate support process C. The support process execution management unit 37 compares the matching position information received from the image recognition unit 36 and the information regarding the set recognition area RA acquired by referring to the set recognition area table 75. Based on the comparison result, the support process execution management unit 37 retroactively determines whether to allow execution of the execution candidate support process C. In the present embodiment, the support process execution management unit 37 allows execution of the execution candidate support process C if the matching position in the image data found through the matching process is included in the set recognition area RA set for the execution candidate support process C. However, the support process execution management unit 37 abandons execution of the execution candidate support process C if the matching position is not included in the set recognition area RA set for the execution candidate support process C.

FIG. 8 is a schematic diagram that illustrates the concept of the support process execution management processing according to the present embodiment. Note that, in the present embodiment as well, the peripheral area (only the first area A1) in the image data is set as the set recognition area RA for the safety control support process AP1*a* of the high accuracy group GH, the area excluding around the vanishing point D (the area formed of the first area A1 and the second area A2) in the image data is set as the set recognition area RA for the driving control support process AP1*b* of the medium accuracy group GM, and the whole area (the area formed of the first area A1, the second area A2, and the third area A3) in the image data is set as the set recognition area RA for the guidance support process AP2 of the low accuracy group GL.

As shown in FIG. 8, in the case where the execution candidate support process C is the safety control support process AP1*a* of the high accuracy group GH, when the matching position is included in the first area A1 (see (a)), the matching position is also included in the set recognition area RA of the safety control support process AP1*a*. Therefore, execution of that particular execution candidate support process C is allowed (expressed as "OK" in FIG. 8). However, when the matching position is included in the second area A2 (see (b)), the matching position is not included in the set recognition area RA of the safety control support process AP1*a*. Therefore, execution of that particular execution candidate support process C is abandoned (expressed as "NG" in FIG. 8).

Alternatively, in the case where the execution candidate support process C is the driving control support process AP1*b* of the medium accuracy group GM, when the matching position is included in the second area A2 (see (c)), the matching position is also included in the set recognition area RA of the driving control support process AP1*b*. Therefore, execution of that particular execution candidate support process C is allowed. However, when the matching position is included in the third area A3 (see (d)), the matching position is not included in the set recognition area RA of the driving control support process AP1*b*. Therefore, execution of that particular execution candidate support process C is abandoned. In the case where the execution candidate support process C is the guidance support process AP2 of the low accuracy group GL, the whole area in the image data is set as the set recognition area RA. Therefore, execution of that particular execution candidate support process C is allowed regardless of the matching position.

The support process execution management unit 37 executes the computational processing described above for all the extracted execution candidate support processes C. If the support process execution management unit 37 allows execution of at least one execution candidate support process C, information regarding the determination results of the matching processes (here, results determining successful matches) is output to the vehicle control module 4 or the navigation device control module 5 depending on the attribute of each execution candidate support process C. Note that if a plurality of support processes AP cannot be simultaneously executed in the driving support system 1, only the execution candidate support process C with the highest priority is executed based on information regarding the priorities set by the priority setting unit 32.

2-2. Procedure for Support Process Execution Management Processing

Figure 9:
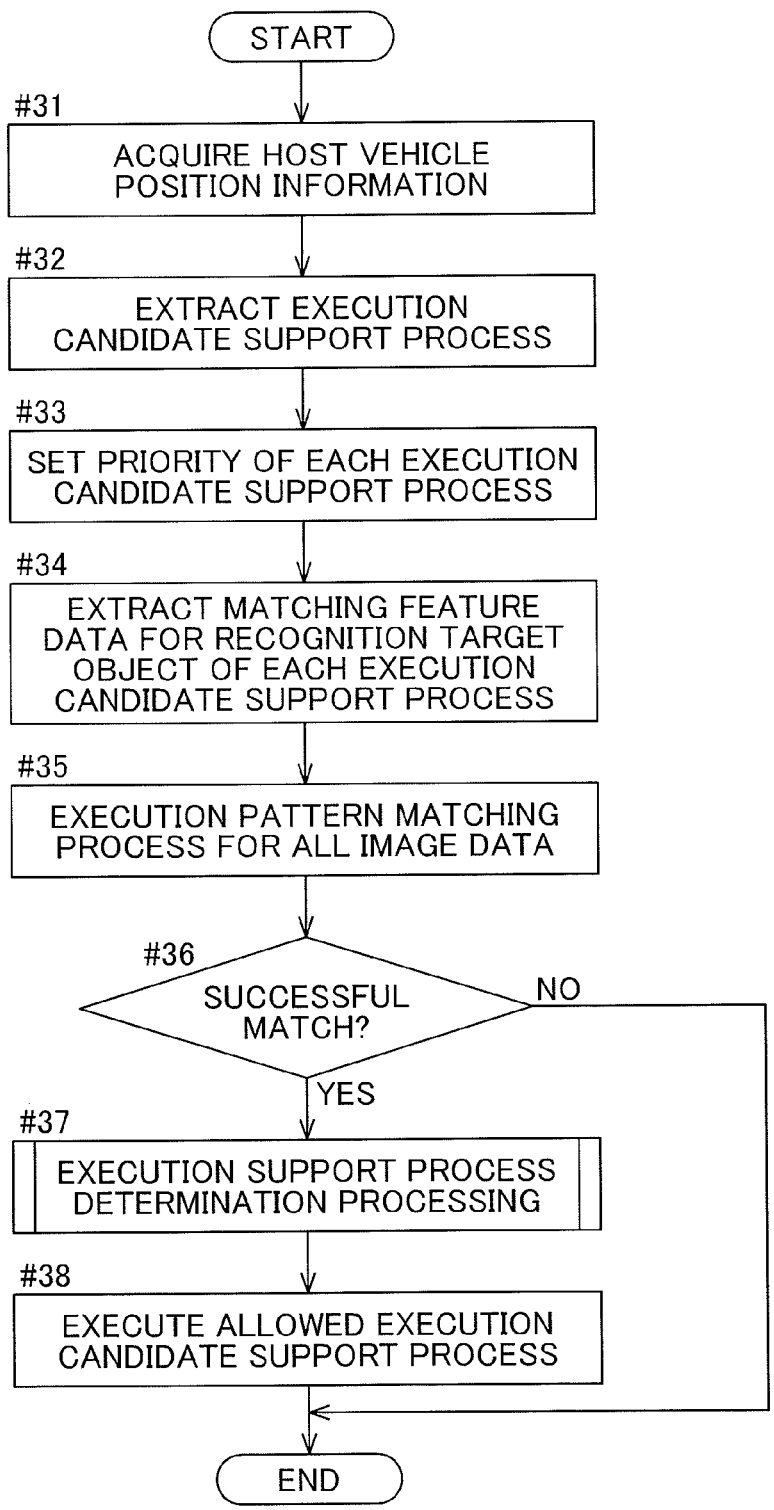
FIG. 9 is a flowchart that illustrates the procedure for the support process execution management processing according to the second embodiment.

Next, a procedure for driving support processing that includes the support process execution management processing executed in the driving support system 1 (a driving support method that includes a support process execution management method) according to the present embodiment will be explained. As shown in FIG. 9, first, the host vehicle position information acquisition unit 23 acquires the host vehicle position information (step #31). The candidate process extraction unit 31 extracts at least one execution candidate support process C based on the host vehicle position information (step #32). The priority setting unit 32 sets a priority for each of the extracted execution candidate support processes C (step #33).

In a different branch, the captured image processing unit 34 generates the image data from the actual captured image taken by the on-vehicle camera 14 (not shown). The recognition target feature extraction unit 35 extracts the recognition target features OB respectively associated with the execution candidate support processes C as the matching feature data (step #34). The image recognition unit 36 performs the pattern matching process on all the image data and all the extracted matching feature data (step #35). If there is no match between any of the image data and the matching feature data (step #36: No), the support process execution management processing is ended. However, if there is a successful match between any of the image data and the matching feature data (step #36: Yes), execution support process determination processing is executed (step #37).

Figure 10:
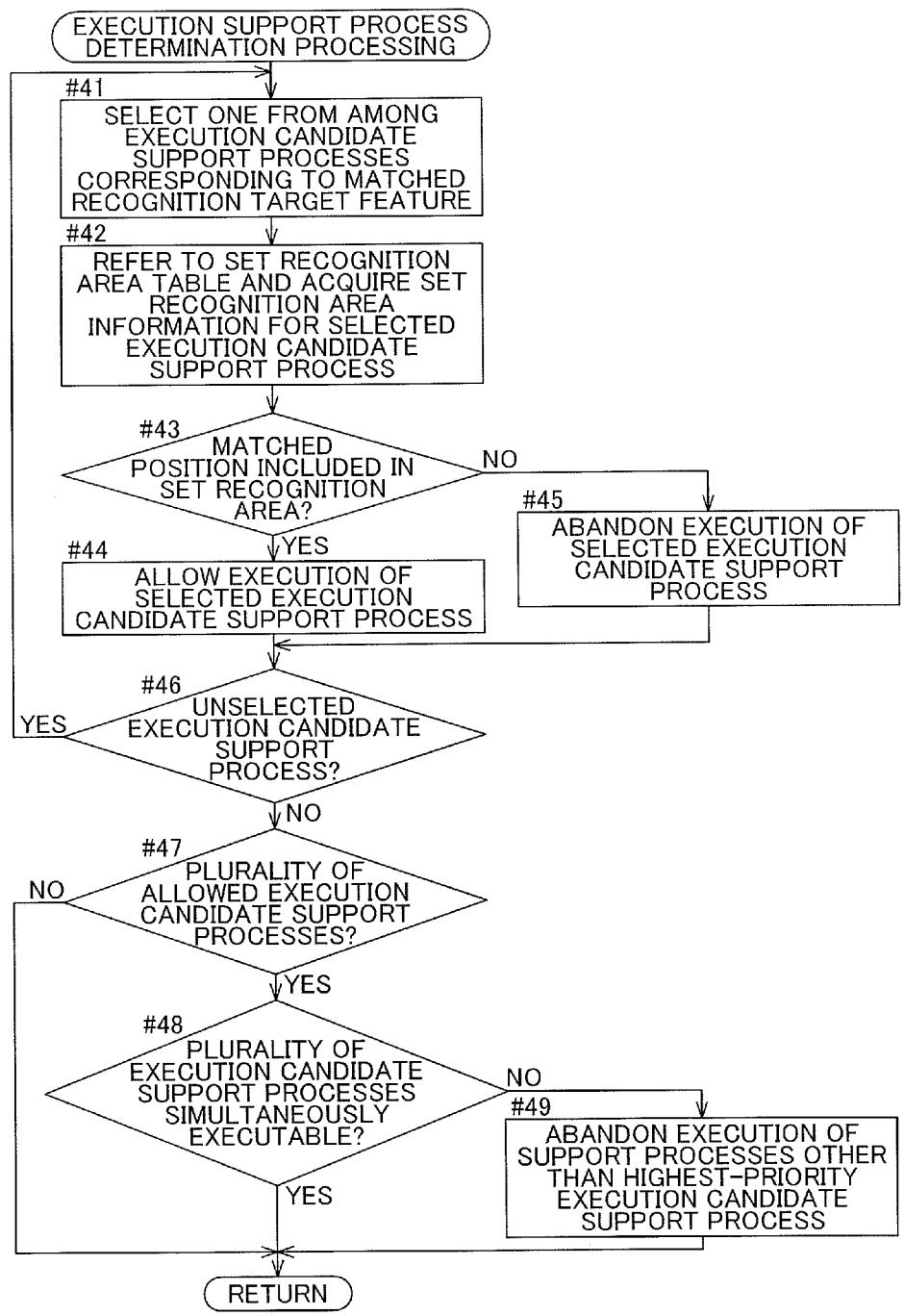
FIG. 10 is a flowchart that illustrates the procedure for execution support process determination processing.

In the execution support process determination processing shown in FIG. 10, the support process execution management unit 37 selects one support process among the execution candidate support processes C corresponding to the matching feature data that successfully matches with the image data (step #41). The support process execution management unit 37 refers to the set recognition area table 75, and acquires the information regarding the set recognition area RA for the selected execution candidate support process C (step #42). The support process execution management unit 37 then determines whether the matching position for the selected execution candidate support process C is included in the set recognition area RA (step #43). If the matching position is included in the set recognition area RA (step #43: Yes), the support process execution management unit 37 allows execution of the selected execution candidate support process C (step #44). However, if the matching position is not included in the set recognition area RA (step #43: No), the support process execution management unit 37 abandons execution of the selected execution candidate support process C (step #45). The various processing at steps #41 to #45 is repeatedly executed until there are no more unselected execution candidate support processes C (step #46: No).

If there is only one or no allowed execution candidate support processes C (step #47: No), the execution support process determination processing is ended, and the routine returns to step #37. If there is a plurality of allowed execution candidate support processes C (step #47: Yes), the support process execution management unit 37 determines whether the support processes can be simultaneously executed (step #48). If the support processes can be simultaneously executed (step #48: Yes), the execution support process determination processing is ended, and the routine returns to step #37. However, if the support processes cannot be simultaneously executed (step #48: No), the support process execution management unit 37 abandons execution of support processes other than the highest-priority execution candidate support process C (step #49). The execution support process determination processing is then ended, and the routine returns to step #37. Thereafter, the vehicle control module 4 or the navigation device control module 5 actually executes the execution candidate support process C ultimately allowed in the execution support process determination processing. The support process execution management processing is then ended. Note that the support process execution management processing described above is repeatedly performed in succession while the vehicle V is traveling.

3. Other Embodiments

Other embodiments of the driving support system according to the present invention will be described here. Note that the configurations described in the respective embodiments below may be applied not only in singular to a particular embodiment, but also in combination with any of the configurations described in other embodiments so long as no contradiction occurs.

(1) In the embodiments described above, as an example, the set recognition area RA for each accuracy group G is set so as to include an area closer to the vanishing point D as the required accuracy level decreases, while also including a common outer edge. However, the embodiments of the present invention are not limited to this example. That is, in another preferred embodiment of the present invention, the outer edges of the set recognition areas RA for the accuracy groups G may be set so as to sequentially approach the vanishing point D, and the set recognition areas RA of the accuracy groups G may be set so as not to overlap. FIG. 11 illustrates an example of the set recognition area table 75 in such case. As shown in the figure, as another preferred embodiment of the present invention, for example, the peripheral area (only the first area A1 in the lower half of FIG. 11) in the image data is set as the set recognition area RA for the support process AP of the high accuracy group GH, the area excluding around the vanishing point D and the peripheral area (only the second area A2 in the lower half of FIG. 11) in the image data is set as the set recognition area RA for the support process AP of the medium accuracy group GM, and the area around the vanishing point D (only the third area A3 in the lower half of FIG. 11) in the image data is set as the set recognition area RA for the support process AP of the low accuracy group GL (likewise for the recognition processing area PA in the first embodiment). In this case, as another preferred embodiment of the present invention, the set recognition areas RA for the accuracy groups G may be set such that only the periphery of a boundary section between adjacent pairs of set recognition areas RA overlap.

(2) In the embodiments described above, as an example, the information regarding the accuracy group G of each support process AP is stored in the required accuracy table 74, and the information regarding the set recognition area RA for each accuracy group G is stored in the set recognition area table 75. However, the embodiments of the present invention are not limited to this example. That is, as another preferred embodiment of the present invention, for example, the information regarding the set recognition area RA may be stored directly associated with each support process AP of the accuracy groups G.

(3) In the embodiments described above, as an example, the plurality of support processes AP is classified into the plurality of accuracy groups G depending on the recognition accuracy required by each support process AP, and the information regarding the set recognition area RA set for each accuracy group G is stored in the required accuracy table 74. However, the embodiments of the present invention are not limited to this example. That is, as another preferred embodiment of the present invention, instead of such grouping, the required accuracy table 74 may individually store the required accuracy for each support process AP. Alternatively, as another preferred embodiment of the present invention, the information regarding the set recognition area RA may be stored individually and directly associated with each support process AP.

(4) In the embodiments described above, as an example, the plurality of support processes AP is classified into three accuracy groups G depending on the recognition accuracy required by each support process AP. However, the embodiments of the present invention are not limited to this example. That is, as another preferred embodiment of the present invention, for example, the plurality of support processes AP may be classified into two accuracy groups G, and the set recognition area RA may be set for each accuracy group G. Alternatively, as another preferred embodiment of the present invention, for example, the plurality of support processes AP may be classified into four or more accuracy groups G, and the set recognition area RA may be set for each accuracy group G.

(5) In the embodiments described above, as an example, the priority of each of the execution candidate support processes C is set such that a higher priority is given to the respective execution candidate support processes C that require a higher recognition accuracy. However, the embodiments of the present invention are not limited to this example. That is, as another preferred embodiment of the present invention, for example, the priority of each of the execution candidate support processes C may be set such that a higher priority is given to the respective execution candidate support processes C that require a higher operation frequency.

(6) In the first embodiment described above, as an example, the matching process is executed in order starting with the recognition target feature OB associated with the highest-priority execution candidate support process C, and only execution of the execution candidate support process C associated with the first successfully matched recognition target feature OB is allowed. However, the embodiments of the present invention are not limited to this example. That is, as another preferred embodiment of the present invention, provided that the position in the image data of the recognition target feature OB recognized by the matching process is at least included in the set recognition area RA set for the execution candidate support process C, execution of the execution candidate support processes C associated with the second or a subsequent successfully matched recognition target features OB may be allowed.

(7) In the second embodiment described above, as an example, information regarding the priorities set by the priority setting unit 32 is utilized only when simultaneous execution of the plurality of support processes AP in the driving support system 1 is not possible. However, the embodiments of the present invention are not limited to this example. That is, similar to the first embodiment, in the second embodiment as well for example, the matching process may be performed in order starting with the matching feature data of the recognition target feature OB associated with the highest priority execution candidate support process C. In such case, execution of only the first execution candidate support process C for which the matching position is determined to be included in the set recognition area RA may be allowed, or execution of the second or a subsequent thus determined candidate support process C may be allowed.

(8) In the first embodiment described above, as an example, the set recognition area RA and the recognition processing area PA coincide for each of execution candidate support processes C. However, the embodiments of the present invention are not limited to this example. That is, the set recognition area RA and the recognition processing area PA may not necessarily coincide. For example, as another preferred embodiment of the present invention, the recognition processing area PA for each of the execution candidate support processes C may be set so as to contain the set recognition area RA, or be contained in the set recognition area RA.

(9) In the embodiments described above, as an example, regulatory signs and road markers are stored in the feature database 72 as the "recognition object" of the matching process. However, the embodiments of the present invention are not limited to this example. That is, as another preferred embodiment of the present invention, the matching process may also be performed using structures, buildings, and the like around roads as recognition objects. In such case, a reference database that includes at least position information and feature point set data of the recognition objects should be created and provided in the driving support system 1.

(10) In the embodiments described above, as an example, the host vehicle position information is acquired by using the map matching process to correct the estimated host vehicle position calculated based on the GPS position data and the dead-reckoning navigation position data. However, the embodiments of the present invention are not limited to this example. That is, as another preferred embodiment of the present invention, for example, the host vehicle position information may be acquired by vehicle-to-vehicle communication or road-to-vehicle communication, which is a so-called road infrastructure.

(11) In the embodiments described above, as an example, the overall driving support system 1 is installed in the vehicle V. However, the embodiments of the present invention are not limited to this example. That is, for example, part of the configuration of the driving support system 1 described above may be provided in a central management device such as a server computer, and the plurality of support processes AP related to the driving support for the vehicle V may be wholly executed through a communication network such as a mobile telephone network or a wireless LAN (Local Area Network).

(12) Other configurations are in all respects mere illustrations of the embodiments disclosed in the present specification, and the embodiments of the present invention are not limited to such configurations. In other words, so long as configurations described in the claims of the present application and equivalent configurations are provided, configurations that partially modify configurations not described in the claims as appropriate are obviously within the technical scope of the invention.

The present invention is well-suited for use in a driving support system that can execute a plurality of support processes related to driving support for a vehicle, as well as a driving support program and a driving support method of the driving support system.

What is claimed is:

1. A driving support system that executes a plurality of support processes related to driving support for a vehicle, the driving support system comprising:
   an image recognition unit that performs image recognition processing to recognize if a recognition object associated with any of the support processes is included in image data captured by an on-vehicle camera;
   a recognition area information storage unit that stores, for each of the plurality of support processes that operates based on a result of the image recognition processing, information regarding a set recognition area in the image data that is set depending on a recognition accuracy of the recognition object set for execution of the support process;
   a candidate process extraction unit that extracts at least one execution candidate support process from the plurality of support processes; and
   a support process execution management unit that allows execution of the extracted execution candidate support process on a condition that a position in the image data of the recognition object recognized by the image recognition processing is included in the set recognition area that is set for the execution candidate support process associated with the recognized recognition object.

2. The driving support system according to claim 1, wherein
   the plurality of support processes includes a first support process, and a second support process for which a recognition accuracy of the recognition object set for execution is lower than the recognition accuracy set by the first support process, and
   the set recognition area that is set for the second support process includes an area closer to a vanishing point in the image data than the set recognition area that is set for the first support process.

3. The driving support system according to claim 1, wherein
   the plurality of support processes is classified into a plurality of accuracy groups depending on the recognition accuracy set by each support process, and
   the recognition area information storage unit stores information regarding the set recognition area that is set depending on the recognition accuracy set by each accuracy group.

4. The driving support system according to claim 1, further comprising:
   a host vehicle position information acquisition unit that acquires host vehicle position information that indicates a current position of the vehicle; and
   a recognition processing area setting unit that sets a recognition processing area, which is an area in the image data, before execution of the image recognition processing for the recognition object, based on the set recognition area for each extracted execution candidate support process, wherein
   the candidate process extraction unit extracts the execution candidate support process based on the host vehicle position information, and
   the support process execution management unit allows execution of the execution candidate support process if the recognition object associated with the execution candidate support process is recognized in the recognition processing area that is set by the recognition processing area setting unit.

5. The driving support system according to claim 1, further comprising:
   a host vehicle position information acquisition unit that acquires host vehicle position information that indicates a current position of the vehicle; and
   a priority setting unit that, for each extracted execution candidate support process, sets a higher priority for the execution candidate support process that requires a higher recognition accuracy, wherein
   the candidate process extraction unit extracts the execution candidate support process based on the host vehicle position information, and the support process execution management unit executes the image recognition processing for the recognition object associated with the execution candidate support process in order starting from the execution candidate support process with the highest priority, and at least allows execution of the execution candidate support process associated with the recognition object that is first recognized.

6. The driving support system according to claim 1, further comprising:
   a host vehicle position information acquisition unit that acquires host vehicle position information that indicates a current position of the vehicle, wherein
   the candidate process extraction unit extracts the execution candidate support process based on the host vehicle position information,
   the image recognition processing unit, with respect to the whole image data, executes the image recognition processing for the recognition object associated with the extracted execution candidate support process, and
   the support process execution management unit allows execution of at least one execution candidate support process, among the extracted execution candidate support processes, for which a position in the image data of the recognition object that is recognized by the image recognition processing is included in the set recognition area that is set for the execution candidate support process.

7. A non-transitory computer readable medium storing a driving support program of a driving support system that executes a plurality of support processes related to driving support for a vehicle, the driving support program executing in a computer the steps of:
   performing image recognition processing to recognize if a recognition object associated with any of the support processes is included in image data captured by an on-vehicle camera;
   extracting at least one execution candidate support process from the plurality of support processes; and
   using information regarding a set recognition area in the image data that is stored in a recognition area information storage unit and set depending on a recognition accuracy of the recognition object set for execution of each of the plurality of support processes that operates based on a result of the image recognition processing, allowing execution of the execution candidate support process extracted at the candidate process extraction step on a condition that a position in the image data of the recognition object recognized by the image recognition processing is included in the set recognition area that is set for the execution candidate support process associated with the recognized recognition object.

8. A driving support method of a driving support system that executes a plurality of support processes related to driving support for a vehicle, the driving support method comprising the steps of:
   performing image recognition processing to recognize if a recognition object associated with any of the support processes is included in image data captured by an on-vehicle camera;
   extracting at least one execution candidate support process from the plurality of support processes; and
   using information regarding a set recognition area in the image data that is stored in a recognition area information storage unit and set depending on a recognition accuracy of the recognition object set for execution of each of the plurality of support processes that operates based on a result of the image recognition processing, allowing execution of the execution candidate support process extracted at the candidate process extraction step on a condition that a position in the image data of the recognition object recognized by the image recognition processing is included in the set recognition area that is set for the execution candidate support process associated with the recognized recognition object.

* * * * *